June 4, 1968     J. F. PAULSEN     3,386,264

RESILIENT COUPLINGS

Filed March 24, 1966     2 Sheets-Sheet 1

United States Patent Office 3,386,264
Patented June 4, 1968

3,386,264
RESILIENT COUPLINGS
Jean Felix Paulsen, Chateaudun, France, assignor to Luxembourgeoise de Brevets et de Participations, Luxembourg (Grand Duche)
Filed Mar. 24, 1966, Ser. No. 537,185
Claims priority, application France, Mar. 30, 1965, 11,300
5 Claims. (Cl. 64—27)

ABSTRACT OF THE DISCLOSURE

The coupling includes two members in the form of a disc and a hub respectively to be resiliently coupled together. Resilient masses are firmly adhered to both the disc and the hub, and these resilient masses absorb, substantially by shearing, low torques applied from one of the members to the other. Resilient abutments are adhered to either the disc or the hub and engage the other member to absorb, substantially by compression, higher torques applied from one member to the other.

---

This invention relates to resilient coupling for the transmission of rotation torques varying with respect to their mean value.

The invention is more especially concerned with resilient coupling for the transmission of rotation torques in motor vehicles.

The chief object of the present invention is to provide a resilient coupling of this kind which is better adapted to meet the requirements of practice than those used up to this time for the same purpose.

The main feature of this invention consists in placing, between the two shafts or the two sets to be coupled with each other, resilient masses adapted to permit of absorbing, by their deformations, in particular their shearing deformations, produced by relative displacements of said shafts under the effect of relatively small torques, the irregularities of said torques, whereas, for greater torques, said relative rotation is limited by resilient abutments working in particular in compression and, in particular, in interposing such a coupling in a motor car transmission, in particular between the engine thereof and the gear box.

Another feature of the present invention relative to automobile vehicles, consists in interposing in the clutch, and in particular in the hub of the clutch disk of such a vehicle, a resilient coupling of the above mentioned type.

A preferred embodiment of the present invention given merely by way of example will be hereinafter described with reference to the appended drawings wherein.

It is reminded that, in a thermal engine of the piston type (gasoline or Diesel engine) the torque is essentially pulsatory. The relative irregularity is the more important as the mean torque is lower. The phenomenon is diagrammatically shown on FIG. 4, the curve of which represent the cyclic evolution of the driving torque C as a function of the time $t$.

Figure 4:
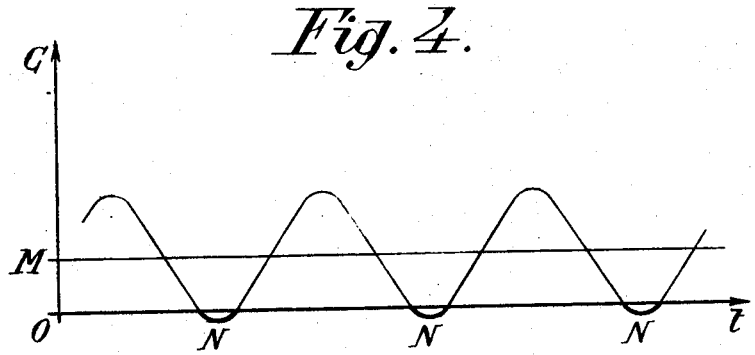
FIGS. 4 and 5 are diagrams showing the variations of a motor vehicle torque.

Such a motor works, in the case shown by FIG. 4, with a low mean torque M (when idling, for instance) the irregularity of which may be more important than the mean torque itself, in such manner that the torque is negative at points such as N.

With a four-stroke engine having $n$ cylinders there are, for every revolution $n/2$ very short time periods where the torque is negative.

When the transmission comprises gears, this phenomenon has for its effect a periodic change in the direction in which the teeth work, which produces a noise. In modern vehicles there are gears always in engagement and which turn when the motor is running while the vehicle is stationary. The torque is then very low and the above mentioned phenomenon may happen, especially when the flywheel has little inertia.

Likewise, when the power of the engine is applied to the gear box in mesh, if the throttle pedal is released, the torgue drops and may become negative. The above mentioned noise, particularly unpleasant, may then also happen for some instants and it is more important than in the case of idling because, as the gear box is in mesh, the inertia applied to the secondary shaft is greater and the shock on the teeth is harder.

Figure 5:
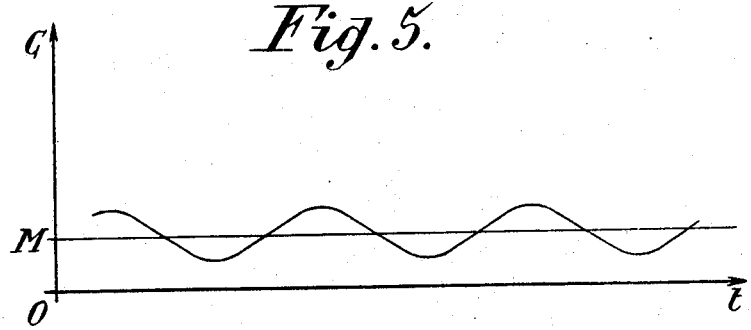

In order to avoid the above mentioned disadvantages and according to the present invention, a resilient coupling is placed in the transmission between the engine and the gear box, in such manner that the absorption of power by said resilient coupling on an increase of the torque and the recovery of power resulting from the inverse deformation of said coupling produce a regulation of the torque. If the coupling is sufficiently resilient the negative values of the torque are eliminated as shown by FIG. 5.

In practice it is convenient to have a coupling suitable for the low mean torques as well as for the high mean torques.

Experience and calculation show that, for vehicles of the common type, the twist angle necessary for the absorption of the oscillations for the low torques (by example from ⅓ to ⅕ of the nominal torque), reaches some degrees, for example 10° or more. Now, if a linear characteristic resilient coupling were used the twist of the resilient coupling for the nominal torque would be about from 30° to 50°, which is difficult to realize and cumbersome.

The resilient coupling according to the present invention is such that for low mean torques (by example lower than from three to four times the engine normal torque), its resiliency permits a twist angle capable of absorbing the torque pulsations and for higher torques and when a given twist angle has been reached (by example about from 10 to 15°) resilient abutments ensure transmission of the torque with an increase of the twist angle not exceeding some degrees.

The coupling device according to the present invention includes, on the one hand, resilient means for absorbing by their deformations and substantially by shearing the pulsation of the torque, and, on the other hand, resilient abutments which act when the torque exceeds the given value.

As a rule, the resilient coupling according to the invention is located between the gear box and the clutch and it is convenient to locate said resilient coupling in the hub of the clutch or of the clutch disk.

Figure 1:
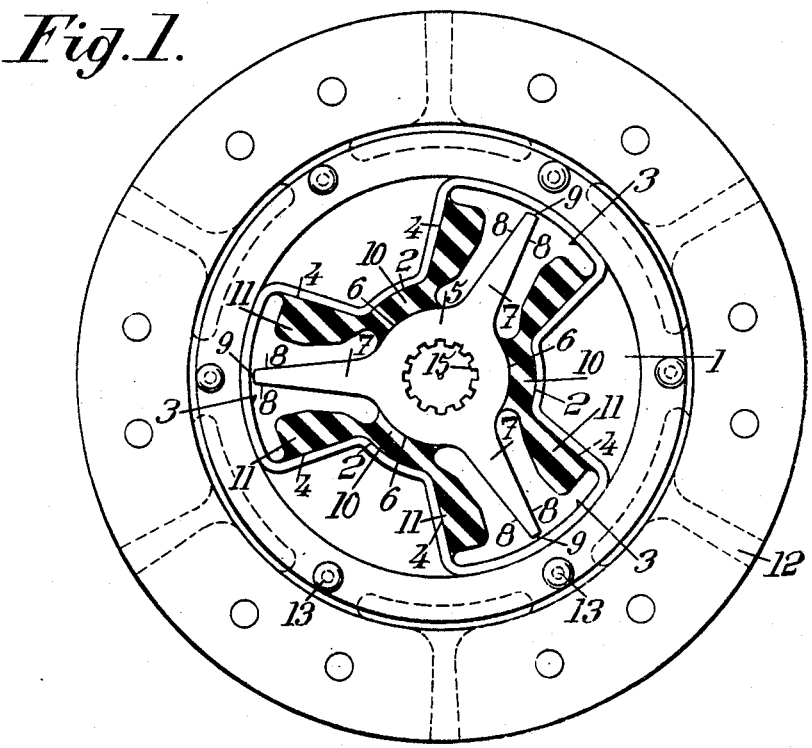
FIGS. 1 and 2 show in transverse section and in axial section, respectively, a coupling device, according to the invention, mounted in a clutch disk for a motor vehicle transmission.
Figure 2:
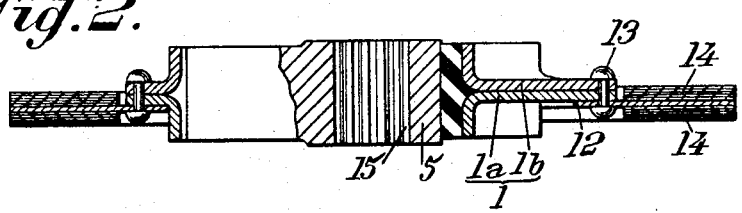

FIGS. 1 and 2 show, in the central portion of the clutch disk a metallic armature 1, made of two portions $1_a$ and $1_b$ assembled together and forming a recess adapted to receive the resilient means coacting with the driving hub.

This recess is formed by stamping of armature 1 and it is limited by:

Three circular wall portions 2 located near the center and adapted to support resilient means working substantially in shearing fashion; and Three outer circular wall portions 3 connected with circular wall portions 2 through radial portions 4.

The recess thus includes three sub-recesses extending radially outwards, between the radial wall portions 4.

Hub 5 comprises cylindrical portions 6 located opposite circular wall portions 2 and radial arms 7 the lateral faces 8 of which are adapted to cooperate with other resilient abutments, hereinafter referred to. The ends 9 of arms 7 are adjacent to the circular portions 3 of armature 1.

The resilient means comprise:

On the one hand three blocks of rubber 10 located in the space between surface portions 6 and 2 and strongly adhered thereto by direct vulcanisation, and On the other hand six blocks 11 adhered to the radial faces of armature 1. In the mean positions said blocks 11 are at a distance from the corresponding faces 8 or arms 7.

Faces 8 come into contact with blocks 11 when the hub has an angular displacement with respect to its mean position of about 5–10° (according to the desired results).

Armature 1 is rigidly fixed to clutch disk 12, provided with its linings 14, by means of rivets 13.

Hub 5 is provided with a bore having grooves 15 formed therein to mount it on the grooved end of the primary shaft on the gear box.

The working of such a coupling is as follows:

A relative angular displacement of hub 5 with respect to armature 1 causes deformation, substantially shearing deformations, or rubber blocks 10. These blocks 11 being of relativley small dimensions, the corresponding torque remains small as long as the lateral faces of arms 7 are not in contact with the rubber blocks 11, this contact happening only after rotation of about 5–10°. Only for important torques and, in particular, for the normal driving torque, this contact between resilient abutments 11 and the lateral faces 8 of arms 7, takes place and gives rise to a small supplementary angular displacement.

In order to avoid a sudden contact between surface portions 8 and abutments 11, said abutments 11 have a suitable shape permitting a gradual application of surface portions 8.

Figure 6:
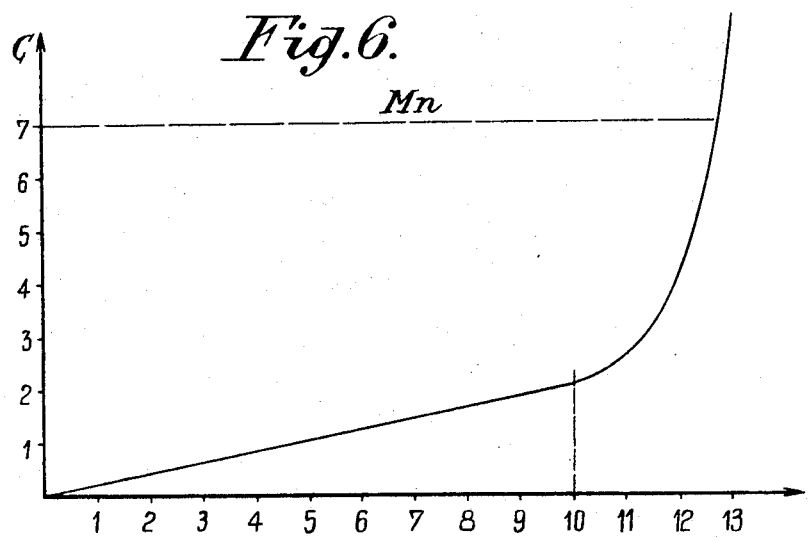
FIG. 6 shows the curve representing the torque as a function of the twist angle in a resilient coupling according to the invention.

As shown by FIG. 6, the curve showing the torques as a function of the twist angles has a substantially linear portion for twist angles lower than 10° and a hyperbolic portion for twist angles higher than 10°. The nominal torque of the motor vehicle is M$n$. For its value the torque is transmitted essentially by blocks 11 in compression.

Figure 3:
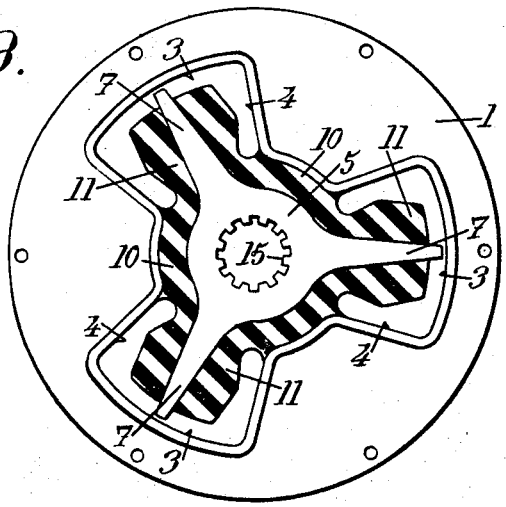
FIG. 3 shows, on a smaller scale, in transverse section, a coupling made according to another embodiment of the invention.

FIG. 3 shows another embodiment of the present invention wherein blocks 11 are mounted on arms 7.

The number of arms and recesses are given merely by way of example, but it is possible to use hubs having two–four or more arms.

In a general manner while the above description discloses what is deemed to be a practical and efficient embodiment of the present invention, said invention is not limited thereto as there might be changes made in the arrangement, disposition and form of the parts without departing from the principle of the invention as comprehended within the scope of the appended claims.

What I claim is:

1. A resilient coupling for the transmission of torques between a first shaft and a second shaft substantially in line therewith, said coupling comprising, in combination, a disc member adapted to be connected to said first shaft, said disc member being provided, in one face thereof, with means forming a recess including circular wall portions of smaller radius, circular wall portions of greater radius and substantially radial wall portions extending between said circular wall portions, whereby said recess includes a plurality of sub-recesses extending radially outwards, a hub adapted to be connected to the said second shaft, said hub being coaxial with said disc member and including a plurality of radial arms extending into said radial sub-recesses respectively, whereby said radial wall portions and said radial arms form two cooperating radial members, resilient masses interconnecting said hub and said recess circular wall portions of smaller radius, said resilient masses being adapted to absorb substantially by shearing low torques below a given value applied by one of said shafts on the other, and resilient abutments adapted to coact with said radial arms of said hub and said radial wall portions of said recess, said resilient abutments being mounted on one of said two co-operating radial members, and being adapted to engage the other of said two co-operating members and to absorb substantially by compression most of the torques applied by one of said shaft on the other which exceed said given value.

2. A resilient coupling according to claim 1 further comprising a clutch means connected to the exterior of said resilient coupling for coupling together said first and second shafts.

3. A resilient coupling according to claim 1 further comprising a disc clutch connected to the outer periphery of said disc member for connecting said resilient coupling to said first shaft.

4. A coupling according to claim 1 wherein said resilient masses are firmly adhered both to said hub and to said recess circular wall portions of smaller radius and said resilient abutments are mounted along said recess radial wall portions.

5. A coupling according to claim 1 wherein said resilient masses are firmly adhered both to said hub and to said recess circular portions of smaller radius and said resilient abutments are mounted along said radial arms.

References Cited

UNITED STATES PATENTS

| | | | |
|---|---|---|---|
| 2,363,469 | 11/1944 | Goldschmidt | 64—27 X |
| 3,148,756 | 9/1964 | Romanini | 64—27 X |
| 3,313,125 | 4/1967 | Hein | 64—14 |

FOREIGN PATENTS

| | | |
|---|---|---|
| 853,688 | 11/1960 | Great Britain. |
| 983,521 | 2/1965 | Great Britain. |

HALL C. COE, *Primary Examiner.*